United States Patent
Okano et al.

(10) Patent No.: US 11,862,852 B2
(45) Date of Patent: Jan. 2, 2024

(54) CABLE ANTENNA, GATE ANTENNA, ANTENNA UNIT, AUTOMATIC CONVEYOR SHELF AND UNMANNED CASH REGISTER

(71) Applicant: Yometel Co., Ltd., Tokyo (JP)

(72) Inventors: Yoshinobu Okano, Tokyo (JP); Koji Wada, Tokyo (JP); Shin Wakabayashi, Tokyo (JP)

(73) Assignee: Yometel Co., Ltd., Tokyo (JP)

( * ) Notice: Subject to any disclaimer, the term of this patent is extended or adjusted under 35 U.S.C. 154(b) by 68 days.

(21) Appl. No.: 17/941,244

(22) Filed: Sep. 9, 2022

(65) Prior Publication Data

US 2023/0021894 A1 Jan. 26, 2023

Related U.S. Application Data

(63) Continuation of application No. PCT/JP2020/010671, filed on Mar. 11, 2020.

(51) Int. Cl.
*H01Q 13/20* (2006.01)
*H01Q 19/10* (2006.01)
*H01Q 1/22* (2006.01)

(52) U.S. Cl.
CPC .......... *H01Q 13/203* (2013.01); *H01Q 19/10* (2013.01); *H01Q 1/2216* (2013.01)

(58) Field of Classification Search
CPC ..... H01Q 1/2216; H01Q 13/203; H01Q 19/10
See application file for complete search history.

(56) References Cited

U.S. PATENT DOCUMENTS 5,467,066 A * 11/1995 Schulze-Buxloh .......... H01Q 13/203
  333/237
5,592,183 A * 1/1997 Henf ........................ H01Q 9/22
  343/749

(Continued)

FOREIGN PATENT DOCUMENTS

EP 1058340 A1 12/2000
JP S53-100845 U 8/1978

(Continued)

OTHER PUBLICATIONS

Decision to Grant a Patent dated Sep. 16, 2022, in corresponding Japanese Application No. 2021-505116; 5 pages (including English Translation).

(Continued)

*Primary Examiner* — Ab Salam Alkassim, Jr.
*Assistant Examiner* — Amal Patel
(74) *Attorney, Agent, or Firm* — Maier & Maier, PLLC

(57) ABSTRACT

A cable antenna an end part of which is connected to an oscillator that supplies a high-frequency current is disclosed. The cable antenna includes: an inner conductor; an insulating layer covering the inner conductor; and an outer conductor covering the insulating layer, wherein only one exposed part is formed in a middle part of the cable antenna in a longitudinal direction, the exposed part formed by removing at least the outer conductor, a distance L between a tip end of the cable antenna and an end of the exposed part on a side closer to the tip end is an odd multiple of a quarter of a wavelength λ, of the high-frequency current, the multiplier being three or greater, and a length G of the exposed part in the longitudinal direction satisfies the following formula (1):

$$\lambda/20 \leq G < \lambda/4 \quad (1)$$

λ: wavelength (mm) of the high-frequency current.

12 Claims, 14 Drawing Sheets

(56) References Cited

U.S. PATENT DOCUMENTS

| | | | |
|---|---|---|---|
| 2010/0321265 A1 | 12/2010 | Yamaguchi et al. | |
| 2014/0158765 A1* | 6/2014 | Chang | H01Q 13/22 235/439 |
| 2017/0364714 A1 | 12/2017 | Lim et al. | |
| 2018/0314864 A1 | 11/2018 | Komaki | |
| 2019/0029751 A1 | 1/2019 | Hancock et al. | |

FOREIGN PATENT DOCUMENTS

| | | | |
|---|---|---|---|
| JP | H11121584 A | 4/1999 | |
| JP | 2012-186737 A | 9/2012 | |
| JP | 2017224302 A | 12/2017 | |
| WO | 2009107216 A1 | 9/2009 | |
| WO | 2012/135115 A2 | 10/2012 | |
| WO | 2016194528 A1 | 12/2016 | |
| WO | WO-2016194528 A1 * | 12/2016 | G06K 7/10 |

OTHER PUBLICATIONS

International Search Report dated Jun. 9, 2020 in corresponding International Patent application No. PCT/JP2020/010671; 4 pages with English Translation.

\* cited by examiner

CABLE ANTENNA, GATE ANTENNA, ANTENNA UNIT, AUTOMATIC CONVEYOR SHELF AND UNMANNED CASH REGISTER

CROSS-REFERENCE TO RELATED APPLICATIONS

This application is based upon and claims the benefit of priority from the PCT Patent Application(s) No. PCT/JP2020/010671, filed Mar. 11, 2020 the entire contents of which are incorporated herein by reference.

FIELD

Embodiments described herein relate generally to a cable antenna, a gate antenna, an antenna unit, an automatic conveyor shelf and an unmanned cash register.

BACKGROUND

There are known non-contact radio communication systems based on the radio frequency identifier (RFID) technology using radio communication tags used in ID cards, such as employee ID cards, or used as inventory management tags.

As such radio communication systems, it is known a handheld radio communication reader device configured to emit an electromagnetic wave to a radio communication tag and read an electromagnetic wave emitted from the radio communication tag.

However, such a handheld radio communication reader device may emit an electromagnetic wave having a directivity and can still be improved to emit electromagnetic waves in all directions. In addition, the handheld radio communication reader device tends to have a relatively complicated structure.

Thus, an object of the present invention is to provide a reader device for radio communication that has a simple configuration and can radiate an electromagnetic wave in all directions.

BRIEF DESCRIPTION OF DRAWINGS

FIG. 10(*b*) is a schematic front view of the gate antenna.

FIG. 12(*b*) is a diagram showing a use case of two gate antennas according to the present embodiment.

FIG. 12(*c*) is a diagram showing a use case of three gate antennas according to the present embodiment.

DETAILED DESCRIPTION

Figure 1:
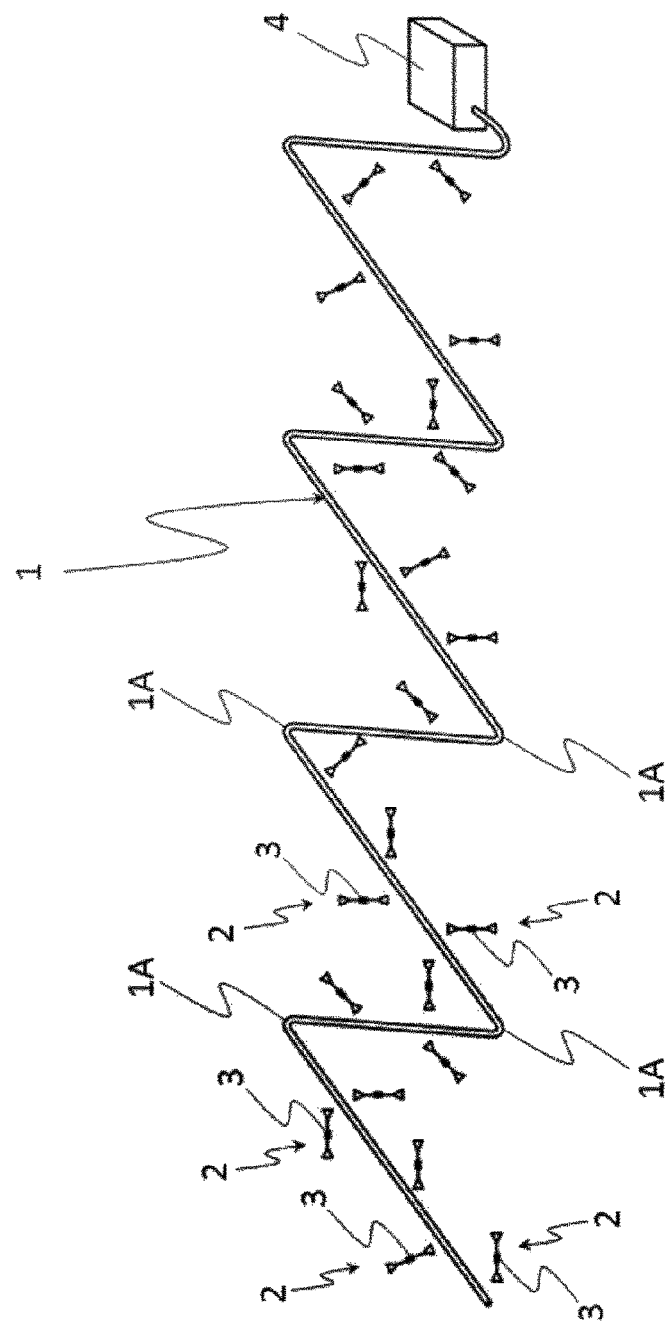
FIG. 1 is a diagram showing an appearance of a cable antenna according to the present embodiment.

In general, according to one embodiment, a cable antenna according to the present embodiment is a cable antenna an end part of which is connected to an oscillator that supplies a high-frequency current, including: an inner conductor extending in a cable-like configuration; an insulating layer covering the inner conductor; and an outer conductor covering the insulating layer, and an exposed part is formed in a middle part of the cable antenna in a longitudinal direction, the exposed part being formed by removing at least the outer conductor.

A distance L between a tip end of the cable antenna and an end of the exposed part on a side closer to the tip end may be an odd multiple of a quarter of a wavelength 2, of the high-frequency current.

A length G of the exposed part in the longitudinal direction may satisfy the following formula (1).

$$\lambda/20 \leq G < L \tag{1}$$

where λ denotes the wavelength (mm) of the high-frequency current, L denotes the distance (mm) between the tip end of the cable antenna and the end of the exposed part on the side closer to the tip end.

The cable antenna may be bent at a plurality of bends in such a manner that sections on both sides of a bend are not parallel to each other.

The cable antenna may form one or more openings having the shape of a rectangle all of four sides of which have a length equal to a half of the wavelength λ.

The rectangle may be a square.

The cable antenna may form two or more of the openings, and one of diagonals of each of the rectangles and a corresponding one of diagonals of an adjacent rectangle may be aligned with each other in plan view.

A gate antenna according to the present embodiment includes: a conductive reflector plate; a non-conductive first spacer member stacked on the reflector plate on one side in a perpendicular direction, the perpendicular direction being perpendicular to front and back surfaces of the reflector plate; the cable antenna according to any one of claims 4 to 6, the cable antenna being stacked on the first spacer member on one side in the perpendicular direction; a second spacer member that is not conductive and is stacked on the cable antenna on one side in the perpendicular direction; and a parasitic element that is conductive and is stacked on the second spacer member on one side in the perpendicular direction.

The reflector plate may have a rectangular shape extending in a lateral direction and a longitudinal direction, and the parasitic element may include: a plurality of first members that extends in the lateral direction and spaced apart from each other in the longitudinal direction; and a plurality of second members that extends in the longitudinal direction and connects end parts of the plurality of first members to each other alternately on either side along the longitudinal direction.

The cable antenna may form three or more of the openings, and the gate antenna may be bent at parts where connections between outermost rectangles in the longitudinal direction of the cable antenna and adjacent rectangles in the longitudinal direction are located so that opposite end parts of the gate antenna in the longitudinal direction stand.

An antenna unit according to the present embodiment includes a plurality of the gate antennas described above, and the plurality of gate antennas may be arranged in different postures.

A gate antenna according to the present embodiment includes the cable antenna described above.

An automatic conveyor shelf according to the present embodiment includes: the gate antenna described above; and an automatic guided robot.

An unmanned cash register according to the present embodiment includes the gate antenna described above.

The cable antenna according to the present embodiment has the exposed part formed by removing the outer conductor in the middle thereof in the longitudinal direction. Since there is no electromagnetic wave produced by the outer conductor in the exposed part, the electromagnetic wave produced by the inner conductor is not canceled but is radiated from the exposed part to the outside. This allows the cable antenna to communicate with radio communication tags arranged around the cable antenna. In this way, electromagnetic waves can be radiated in all directions around the cable antenna with a simple arrangement.

A cable antenna 1 according to an embodiment of the present invention will be described with reference to the drawings.

As shown in FIG. 1, the cable antenna 1 according to this embodiment and a radio IC chip 3 mounted on a radio communication tag 2 form a part of a communication reader that performs radio communication through transmission and reception of an electromagnetic wave. FIG. 1 is a diagram showing an appearance of the cable antenna 1 according to this embodiment.

As an example of such radio communication, in this embodiment, an RFID system that uses an electromagnetic wave having a frequency in the UHF band ranging from 300 MHz to 3 GHz will be described.

As the radio IC chip 3, any chip commonly used in the RFID system can be used.

An oscillator 4 that supplies a high-frequency current is connected to one end of the cable antenna 1.

The cable antenna 1 is bent at a plurality of bends 1A in such a manner that the parts on both sides of each bend are not parallel to each other. In the example shown, the cable antenna 1 has a so-called serpentine shape.

In FIG. 1, a plurality of radio communication tags 2 is arranged in random orientations around the cable antenna 1.

Figure 2:
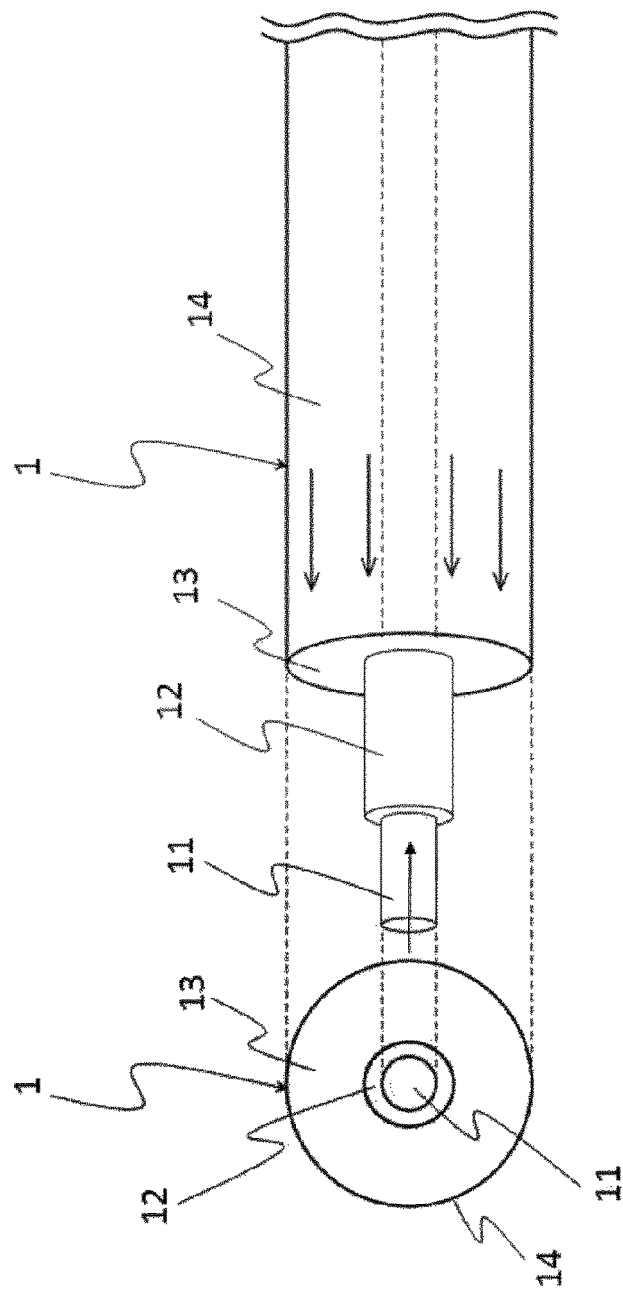
FIG. 2 is a diagram for illustrating a cross-sectional structure of the cable antenna shown in FIG. 1.

As shown in FIG. 2, the cable antenna 1 has an inner conductor 11, an insulating layer 12, and an outer conductor 13. FIG. 2 is a diagram for illustrating a cross-sectional structure of the cable antenna 1. As shown by straight arrows in FIG. 2, currents flow in the inner conductor 11 and the outer conductor 13 in the opposite directions. The oscillator 4 is connected to the inner conductor 11 and the outer conductor 13, and the inner conductor 11 and the outer conductor 13 each form one continuous current path.

The inner conductor 11 is a conductor wire extending like a cable, and an annealed copper wire can be used as the material of the inner conductor 11, for example. However, the material of the inner conductor 11 can be any other material that can be used as a conductor wire.

The insulating layer 12 is an insulating member that covers the inner conductor 11 from radially outside thereof, and foamed polyurethane can be used as the material of the insulating layer 12, for example. However, the material of the insulating layer 12 can be any other material that can be used as an insulating member.

The outer conductor 13 is a conductive body that covers the insulating layer 12 from radially outside thereof, and an aluminum foil or an aluminum braid can be used as the material of the outer conductor 13, for example. However, the material of the outer conductor 13 can be any other material that can be used as a conductive body. The outer conductor 13 is covered with an insulating outer jacket 14.

Figure 3:
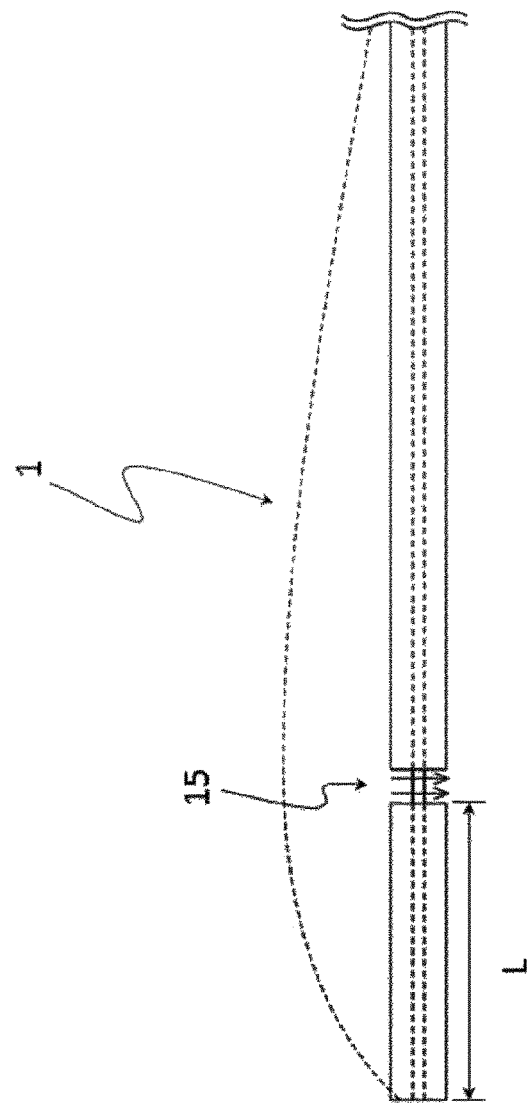
FIG. 3 is a diagram showing a tip end part of the cable antenna shown in FIG. 1.

As shown in FIG. 3, the cable antenna 1 has an exposed part 15 in the middle in the longitudinal direction, the exposed part 15 being formed by removing at least the outer conductor 13. FIG. 3 is a diagram showing a part of the cable antenna 1 at a tip end thereof.

In the example shown, in the exposed part 15, the insulating layer 12 as well as the outer conductor 13 is removed, and the inner conductor 11 is exposed. That is, the exposed part 15 means a part in which a component located on the radially inner side of the outer conductor 13 is exposed.

In the exposed part 15, the outer conductor 13 and the insulating layer 12 are removed along the entire circumference of the cable antenna 1 in the circumferential direction about the central axis of the cable antenna 1.

As shown in FIG. 3, the part of the cable antenna 1 closer to the tip end than the exposed part 15 extends straight from the exposed part 15. The cable antenna 1 has only one exposed part 15.

As such a cable antenna 1, the so-called coaxial cable, which is a shielded cable used for telecommunication, can be additionally worked and used.

The coaxial cable has the internal structure shown in FIG. 2, and the cable antenna 1 according to the present embodiment can be provided simply by removing a predetermined length G of the outer conductor of the coaxial cable.

For example, a predetermined length of the outer jacket 14 is removed from the coaxial cable, and then the same length of the outer conductor 13 is removed. The length is a dimension in the longitudinal direction.

In general, in the coaxial cable, a magnetic field produced by the current flowing in the inner conductor 11 and a magnetic field produced by the current flowing in the outer conductor 13, whose direction is opposite to that of the magnetic field produced by the current in the inner conductor 11, cancel each other. Therefore, no electromagnetic energy is radiated to the outside, and the coaxial cable can efficiently transmit signals.

Figure 4:
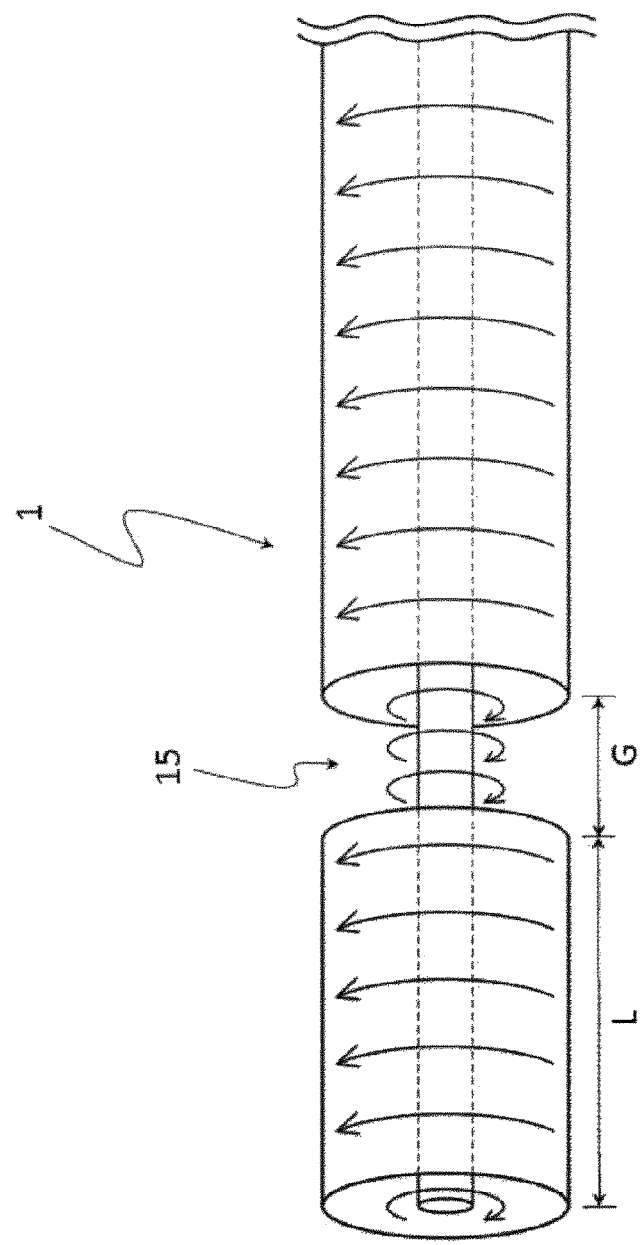
FIG. 4 is an enlarged view of the tip end part of the cable antenna shown in FIG. 3.

As shown in FIG. 4, when a part of the outer conductor 13 of the coaxial cable is removed, the balance between the circumferential magnetic field around the outer conductor 13 and the circumferential magnetic field around the inner conductor 11, which would otherwise cancel each other, is lost. FIG. 4 is an enlarged view of a tip end part of the cable antenna 1.

As a result, the circumferential magnetic field around the inner conductor 11 is not canceled in the exposed part 15, and this state can be regarded as a state where an annular magnetic field is occurring only in the exposed part 15 of the cable antenna 1.

This state is equivalent in functionality to a state where the exposed part 15 is connected to a power supply, and a voltage is applied between the front and the end of exposed part 15, regardless of the actual positional relationship between the cable antenna 1 and the oscillator 4. Therefore, as shown in FIG. 3, the current is distributed in the entire cable antenna 1 to be smaller in the tip end part and larger in the exposed part 15. The current flows in the longitudinal direction through the outer jacket 14 of the cable antenna 1.

As shown in FIG. 4, a distance L (mm) between the tip end of the cable antenna 1 and the end of the exposed part 15 on the side closer to the tip end is preferably an odd multiple of a quarter of a wavelength λ of the high-frequency current. This can increase the amplitude of the current. By adjusting the length G of the exposed part 15 according to the overall diameter of the cable antenna 1 used, the radiated electric field strength can be adjusted.

Here, the length G of the exposed part 15 in the longitudinal direction satisfies the following formula (1).

$$\lambda/20 \leq G < L \quad (1)$$

In this formula, λ denotes the wavelength (mm) of the high-frequency current, and L denotes the distance (mm) between the tip end of the cable antenna and the end of the exposed part 15 on the side close to the tip end as described above.

When the length G of the exposed part 15 in the longitudinal direction is too small, the effect of the exposed part 15 may be insufficient.

This is because when the length G of the exposed part 15 is small, the outer conductors 13 on the opposite sides of the exposed part 15 in the longitudinal direction are electrically conducting even though the outer conductor 13 is physically removed in the exposed part 15. Therefore, the condition that $\lambda/20 \leq G$ in the formula (1) is required.

When the length G of the exposed part 15 in the longitudinal direction is too large, the electromagnetic wave radiated to the outside may be weak. This is because when the dimension of the exposed part 15 is large, the annular magnetic field produced in the exposed part 15 is dispersed and has reduced effect. Therefore, the condition that G<L in the formula (1) is required.

(Verification Tests)

Next, evaluation results of antenna input characteristics of the cable antenna 1 according to this embodiment will be described. In these tests, variations of antenna characteristics with the distance L between the tip end of the cable antenna 1 and the exposed part 15 were evaluated.

First, in a first verification test, the transition of the reflection loss $S_{11}$ was evaluated for four samples whose distance L from the exposed part 15 to the tip end was 10 mm, 80 mm, 160 mm, and 240 mm.

Here, the reflection loss $S_{11}$ is a value indicating the ratio of the reflected power from the cable to the power supply to the input power to the cable in units of decibels, and calculated according to the following formula (2). The smaller the value of the reflection loss, the higher the efficiency of the cable antenna 1 is.

$$S_{11} = 10 \times \frac{\text{reflected power}}{\text{input power to cable}} [db] \quad (2)$$

In this verification test, an electromagnetic wave having a frequency of 850 MHz to 1000 MHz was input. As the results of this test, transitions of the reflection loss $S_{11}$ are shown in FIG. 5.

Figure 5:
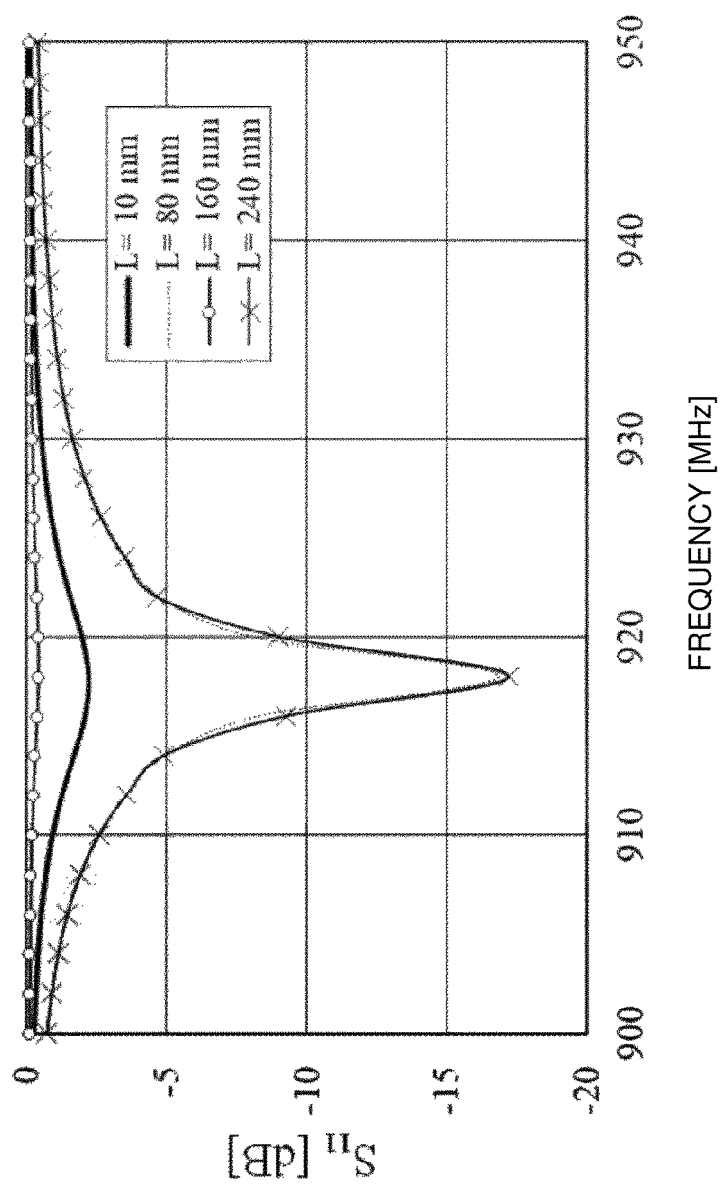
FIG. 5 is a diagram showing evaluation results of a loss coefficient in a verification test.

As shown in FIG. 5, $S_{11}$ assumes a large value when L=10 mm and L=160 mm. This means that when a power is fed from the power supply to the cable, the reflected power is extremely high. In these cases, the power is not efficiently injected into the cable, so that the electromagnetic wave radiation from the cable antenna 1 decreases as can be seen.

On the other hand, $S_{11}$ assumes a small value when L=80 mm and L=240 mm. In these cases, the input power is efficiently injected into the cable antenna 1, and the electromagnetic wave radiation from the cable antenna 1 increases as can be seen. Here, when L=80 mm, the distance L is approximately equal to a quarter of the wavelength λ of the electromagnetic wave at a frequency at which $S_{11}$ significantly decreases. Therefore, it can be confirmed that matching between the cable antenna 1 and the oscillator 4 is good when L is an odd multiple of a quarter of the wavelength of the electromagnetic wave. Here, that matching is good means that impedance matching is achieved.

Figure 6:
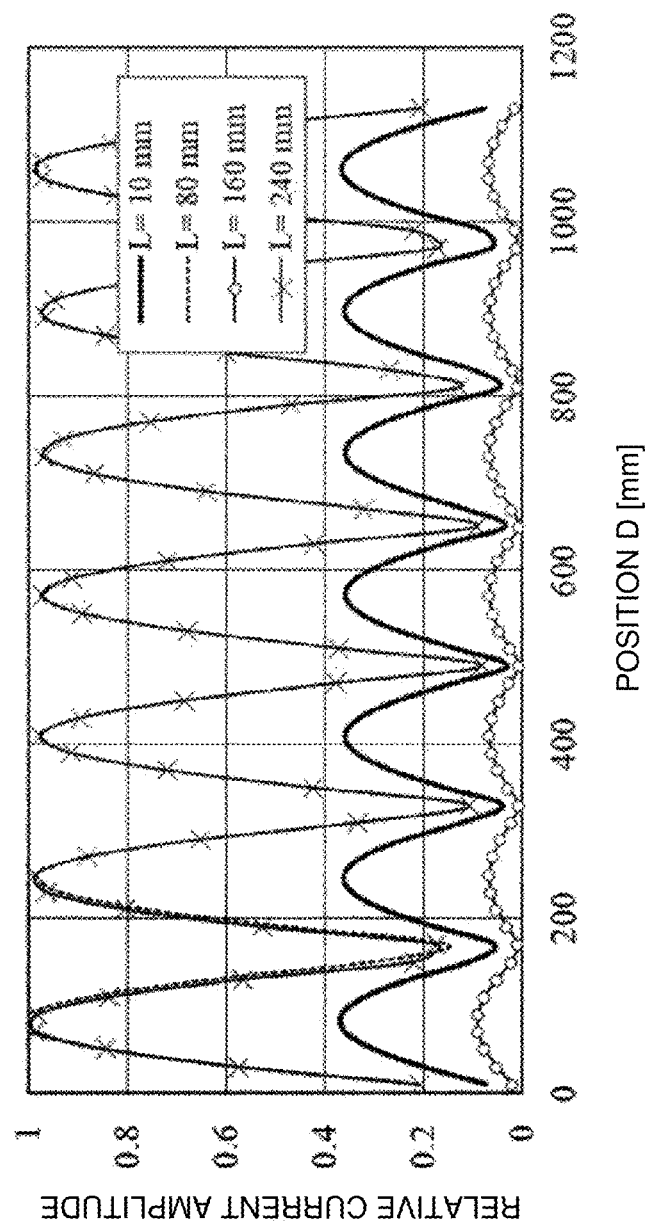
FIG. 6 is a diagram showing evaluations results of a current distribution in a verification test.

Next, in a second verification test, distributions of the current induced on the cable antenna 1 for different distances L from the exposed part 15 to the tip end were evaluated. As in the first verification test, four evaluation samples whose L was 10 mm, 80 mm, 160 mm, and 240 mm were used. As the results of this test, distributions of the current induced on the cable are shown in FIG. 6. Provided that the maximum amplitude of the induced current that varies with the magnitude of L is 1, FIG. 6 shows relative current distributions at a distance D from the tip end of the cable antenna 1.

As confirmed in FIG. 6, when L is an odd multiple of λ/4, matching between the cable antenna 1 and the oscillator 4 is improved, and the induced current, which is a source of the electromagnetic wave radiation, increases as can be seen. From this fact, it can be considered that it is desirable that the distance L between the tip end of the cable antenna 1 and the end of the exposed part 15 on the side closer to the tip end be set to be an odd multiple of a quarter of the wavelength of the electromagnetic wave used.

As described above, the cable antenna 1 according to this embodiment has the exposed part 15 formed by removing the outer conductor 13 in the middle thereof in the longitudinal direction. Since there is no electromagnetic wave produced by the outer conductor 13 in the exposed part 15, the electromagnetic wave produced by the inner conductor 11 is not canceled but is radiated from the exposed part 15 to the outside. This allows the cable antenna 1 to communicate with the radio communication tags 2 arranged around the cable antenna 1. In this way, electromagnetic waves can be radiated in all directions around the cable antenna 1 with a simple arrangement.

When the cable antenna 1 according to the present embodiment is arranged in the configuration shown in FIG. 1, the cable antenna 1 can communicate along the total length thereof, such as several to a dozen meters. Thus, if the cable antenna 1 is used for identification or management of the radio communication tags 2, an RFID tag system can probably be constructed with extremely low cost.

In addition, since the distance L between the tip end of the cable antenna 1 and the end of the exposed part 15 on the side closer to the tip end is an odd multiple of a quarter of the wavelength λ of the high-frequency current, the amplitude of the current induced at the exposed part 15 can be increased.

In addition, since the length G in the longitudinal direction of the exposed part 15 satisfies the formula (1), electromagnetic waves can be effectively emitted from the exposed part 15.

In addition, the cable antenna 1 is arranged in a serpentine configuration and bent at a plurality of bends 1A in such a manner that the parts on both sides of each bend 1A are not parallel to each other. Therefore, an electromagnetic wave caused by a current excited by an annular magnetic field produced in the exposed part 15 is radiated to the periphery of the cable antenna 1.

Although the electromagnetic wave radiated in this way reaches a sufficient level in the vicinity of the cable antenna 1, the electromagnetic wave is weak at a position distant from the cable antenna 1 unlike a case of a handheld reader in which signals are injected into an antenna that efficiently radiates an electromagnetic wave in a particular direction.

However, the magnetic field (electric field) produced by the cable antenna 1 is not uniform. Therefore, even though the directions of electromagnetic waves produced by each of the radio communication tags 2 arranged in random orientations in the vicinity of the cable antenna 1 differ, the cable antenna 1 is expected to be able to accommodate the difference and identify all information from the large number of radio communication tags 2 arranged in the vicinity of the cable antenna 1.

Thus, when the cable antenna 1 having such characteristics is disposed on a shelf, for example, and radio communication tags 2 are attached to commodities displayed on the shelf, the cable antenna 1 is expected to make a contribution to efficient merchandise management.

Figure 7:
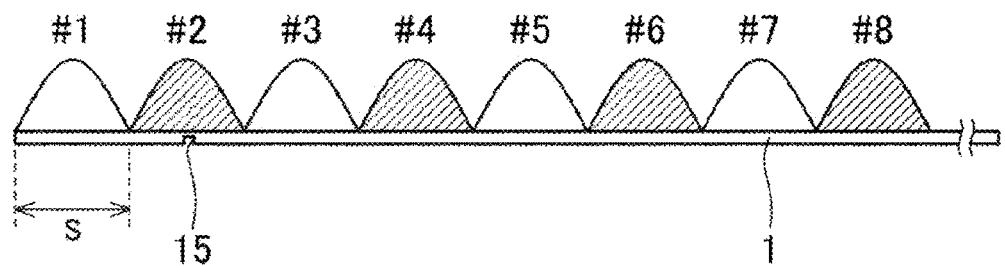
FIG. 7 is a diagram showing a waveform of a current flowing in the cable antenna shown in FIG. 1.

FIG. 7 is a diagram showing the current on the cable antenna 1 shown in FIG. 6 in different colors for different sections (#1, #2, and so on) of the cable antenna 1, for the sake of convenience.

As shown in FIG. 7, the distribution of effective current flowing in the cable antenna 1 is sinusoidal and periodically varies along the cable. Although the direction of the effective current varies with time, the directions of the effective current in odd-numbered or even-numbered sections coincide with each other at a certain instant.

Figure 8:
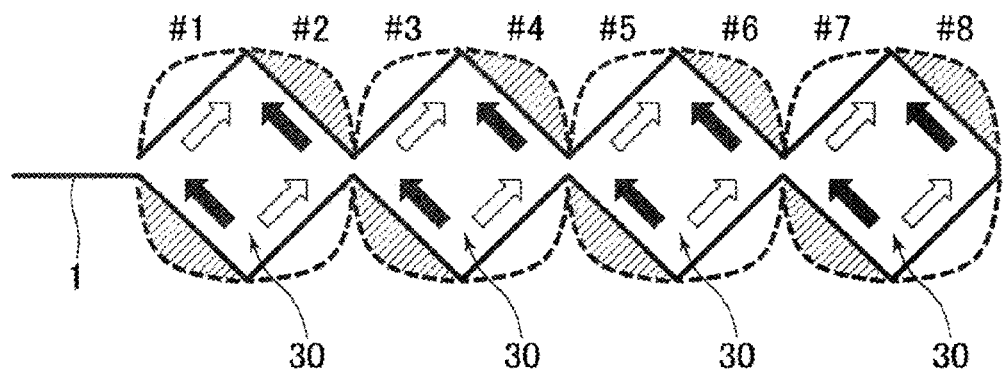
FIG. 8 is a plan view of the cable antenna shown in FIG. 1 arranged to form a plurality of openings.

Next, a gate antenna 50 (see FIG. 10) formed by the cable antenna 1 will be described. First, the shape of the cable antenna 1 used for the gate antenna 50 will be described with reference to FIG. 8. FIG. 8 is a plan view of the cable antenna 1 arranged to form a plurality of openings 30.

As shown in FIG. 8, the gate antenna 50 according to the present embodiment is formed by the cable antenna 1 arranged and bent so as to form a plurality of rectangular openings 30.

More specifically, the cable antenna 1 is configured so that one of the diagonals of each rectangle is aligned with the corresponding one of the diagonals of the adjacent rectangles in plan view.

In the example shown, the rectangular openings 30 formed by the cable antenna 1 have a square shape all of the four sides of which have the same length. The length (a dimension S shown in FIG. 7) of the sides of the rectangle is a half of the wavelength $\lambda$. That is, the amplitude of the current is the minimum at the ends of each side of the rectangle.

Although the opening 30 has a square shape in the example shown, the opening 30 may have a rhombus shape all of the four sides of which have the same length.

Alternatively, the rectangle may be an oblong rectangle or a parallelogram the four sides of which do not all have the same length. Furthermore, the shape of the opening 30 is not limited to the rectangle and may be a triangle, a circle or the like as far as all the openings 30 have the same current distribution.

When the cable antenna 1 is arranged as described above, parts of the cable forming adjacent sides of the square openings 30 are not parallel to each other, and therefore, the electromagnetic interference therebetween is controlled to be small.

Therefore, the direction of the current in each side of the opening 30 is the same as that of the cable antenna 1 arranged on a straight line.

On the other hand, any combination of sides that are parallel to each other is a combination of odd-numbered sections or a combination of even-numbered sections in FIG. 7 (a combination of white sinusoidal waves or a combination of hatched sinusoidal waves in FIG. 7), and therefore is complementary to each other, so that a strong electromagnetic wave radiation can be stably produced along the array of square openings 30.

Furthermore, the electromagnetic waves radiated from the sides of the openings 30 are generally perpendicular to each other, so that stable communication can be provided regardless of the orientations of the small antenna and the radio tags placed in parallel with the sheet of FIG. 8.

Although FIG. 8 shows an example where there are four square openings 30, the number of square openings 30 can be arbitrarily chosen as far as the number is equal to or greater than one.

Furthermore, the electromagnetic wave radiation caused by the current flowing in the square openings 30 formed by the cable antenna 1 according to the present embodiment will be described in detail.

Figure 9:
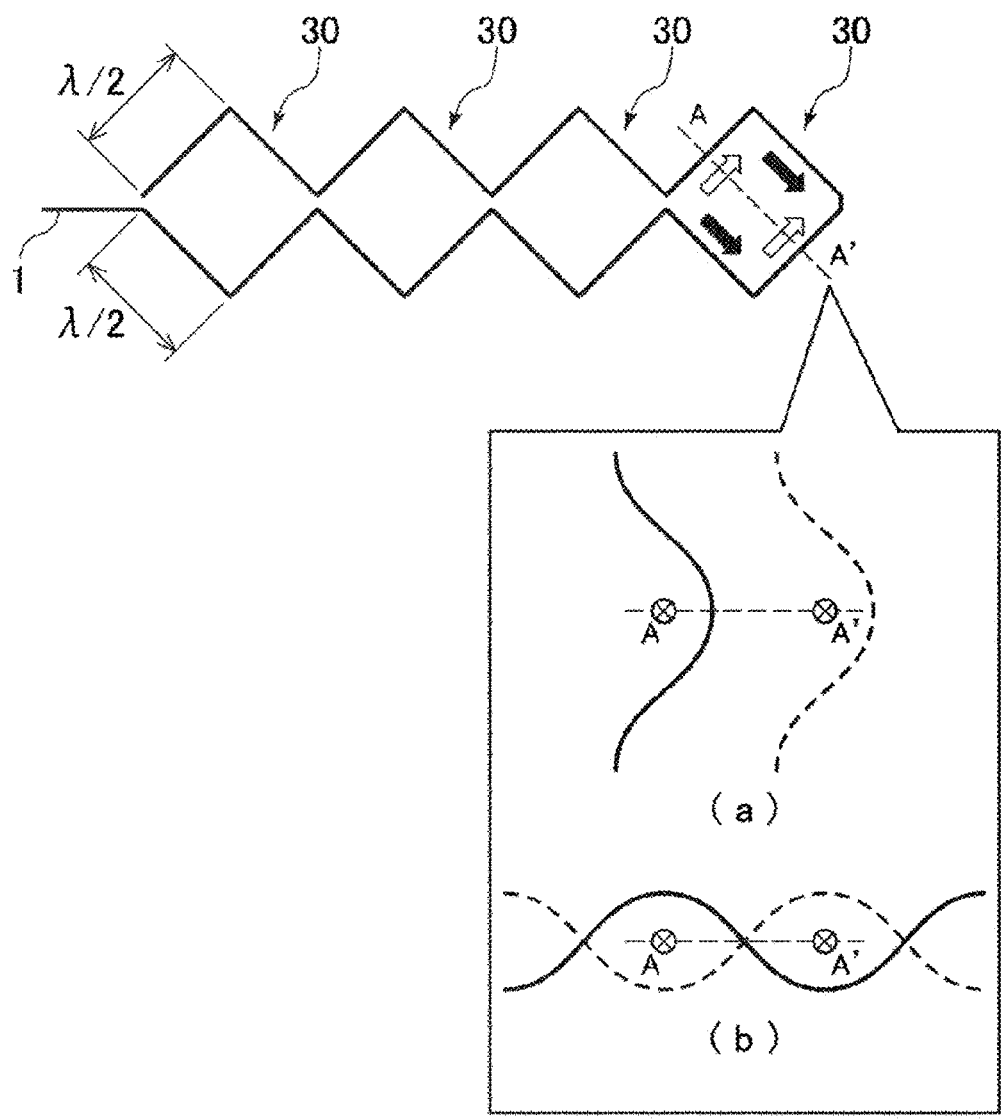
FIG. 9 is a diagram for illustrating a state where a current is flowing in the cable antenna shown in FIG. 8.

Currents flowing in two opposed sides A and A' of the square opening 30 and electromagnetic wave radiations caused by the currents are as shown in the cross-sectional views shown in the box in FIG. 9.

In these cross-sectional views, the solid lines indicate an electromagnetic wave radiation caused by the left current, and the dashed lines indicate an electromagnetic wave radiation caused by the right current.

As shown in the cross-sectional view (a) in FIG. 9, in the upward direction (the direction perpendicular to the sheet of the drawing from above to below or from below to above the plane of the square opening 30), the electromagnetic waves are radiated from the sides A and A' in a complementary relationship.

On the other hand, as shown in the cross-sectional view (b) in the box, in the direction from the side A to the side A' or the opposite direction (the direction parallel to the plane of the square opening 30 in any case), the length of the side, that is, the distance between the sides A and A' is about $\lambda/2$.

Therefore, the phase of the sinusoidal electromagnetic wave radiated from the side A' is shifted by 180° at the position of the side A and is 180° out of phase with the sinusoidal electromagnetic wave radiated from the side A, and thus the sinusoidal electromagnetic waves radiated from the sides A and A' cancel each other.

When the cable antenna 1 forms the array of square openings 30 shown in FIGS. 8 and 9, the radiations are satisfactorily provided in the direction perpendicular to the sheet of the drawing, although the radiations in the direction parallel to the sheet of the drawing are suppressed.

For example, when the array of square openings 30 formed by the cable antenna 1 is placed on a shelf or the like, a radio tag placed in any orientation in parallel to the plane of the array of square openings 30 can be well identified.

On the other hand, a radio tag placed outside the array of square openings 30 is difficult to be identified even if the radio tag is placed on the same shelf, and therefore, the cable antenna 1 can be advantageously used for determination of the position of a commodity with a radio tag on the shelf.

Next, a configuration of the gate antenna 50 including the cable antenna 1 having such openings 30 will be described.

The electromagnetic wave radiations from the array of openings 30 formed by the cable antenna 1 are basically radiations in the opposite directions perpendicular to the plane of the openings. When the cable antenna 1 is used on a shelf or the like, the cable antenna 1 desirably radiates electromagnetic waves only in one direction in which commodities are located, in order to identify only commodities with a radio tag on the shelf.

Therefore, as shown in FIGS. 10, a reflector plate 51 is advantageously arranged immediately below the array of openings 30 formed by the cable antenna 1.

Specifically, as shown in FIGS. 10, with the gate antenna 50 according to the present embodiment, the reflector plate 51 that is conductive, the cable antenna 1, and a conductive parasitic element 52 are stacked in a perpendicular direction, which is perpendicular to the front and back surfaces of the reflector plate 51.

Figure 10A:
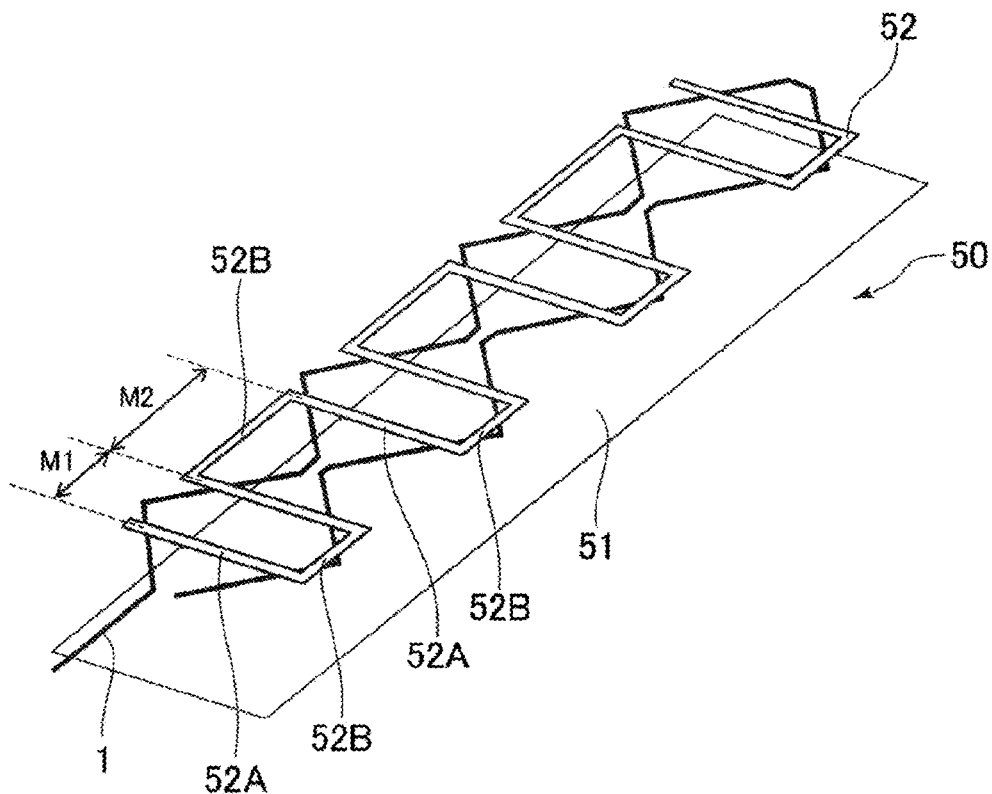
FIG. 10(*a*) is a schematic perspective view of a gate antenna according to the present embodiment.
Figure 10B:
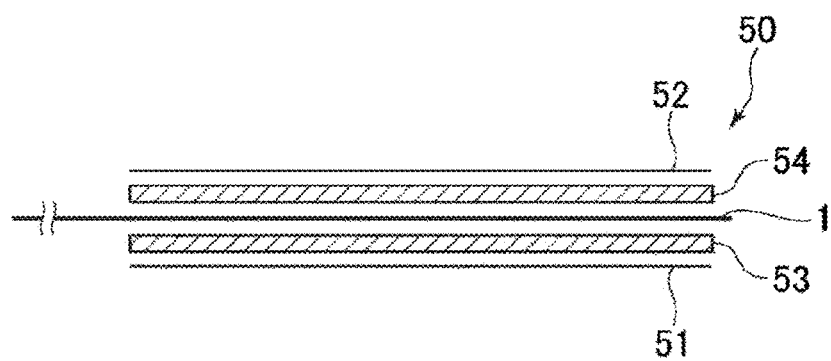

As shown in FIG. 10(b), a first non-conductive spacer member 53 is sandwiched and stacked between the reflector plate 51 and the cable antenna 1 in the perpendicular direction. In addition, a second non-conductive spacer member 54 is sandwiched and stacked between the cable antenna 1 and the parasitic element 52 in the perpendicular direction.

Figure 11:
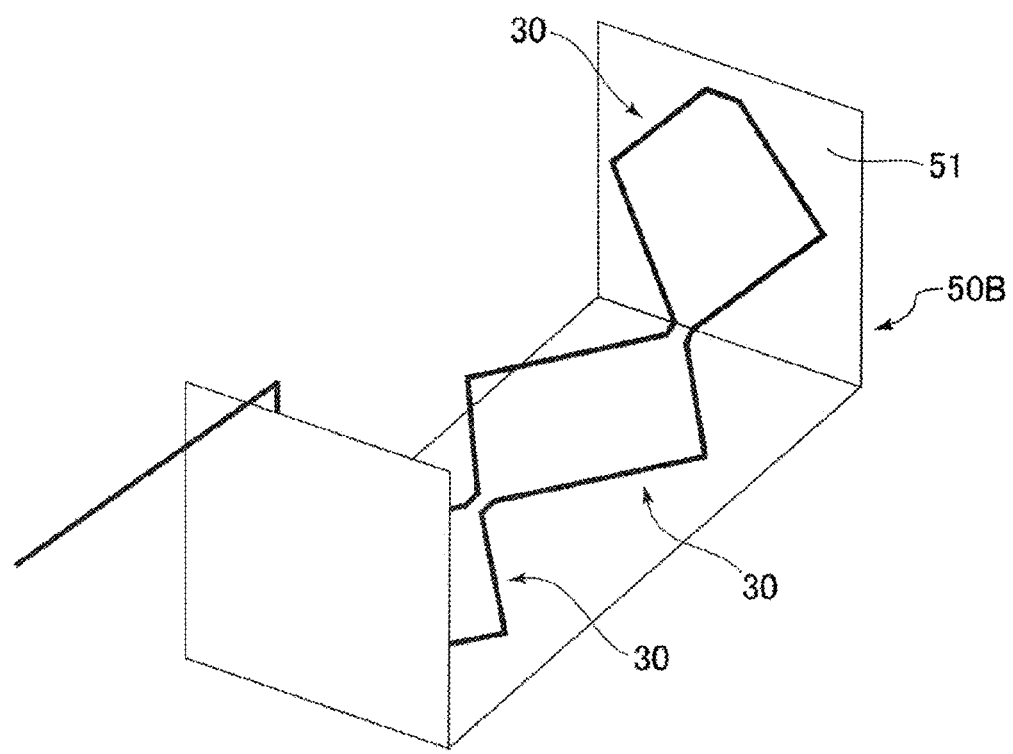
FIG. 11 is a schematic perspective view of a variation of the gate antenna according to the present embodiment.

In FIGS. 10(a) and 11, illustration of the first spacer member 53 and the second spacer member 54 is omitted.

The reflector plate 51 has a rectangular shape extending in the lateral direction and the longitudinal direction.

The first spacer member 53 is a non-conductive plate-like member stacked on the reflector plate 51 on one side thereof in the perpendicular direction.

The cable antenna 1 is stacked on the first spacer member 53 on one side thereof in the perpendicular direction. Since the first spacer member 53 is provided, the cable antenna 1 is spaced apart from the reflector plate 51 in the perpendicular direction and is not in direct contact with the reflector plate 51.

The second spacer member 54 is a non-conductive plate-like member stacked on the cable antenna 1 on one side thereof in the perpendicular direction.

Since the second spacer member 54 is provided, the cable antenna is spaced apart from the parasitic element 52 in the perpendicular direction and is not in direct contact with the parasitic element 52.

The parasitic element 52 is stacked on the second spacer member 54 on one side thereof in the perpendicular direction. The parasitic element 52 is formed by a first member 52A and a second member 52B.

A plurality of first members 52A extends in the lateral direction and is spaced apart from each other in the longitudinal direction.

A plurality of second members 52B extends in the longitudinal direction and connects the lateral ends of the plurality of first members 52A to each other. The second members 52B connect the plurality of first members 52A alternately on either side along the longitudinal direction.

Next, a function of the parasitic element 52 will be described.

When the array of openings 30 formed by the cable antenna 1 and the reflector plate 51 are incorporated, a linear cable part that is not involved in the formation of the array of openings 30 and the reflector plate 51 may interact with each other to compromise the uniformity of the strength of the radiated electric field. This may cause deflection of the radiation in the longitudinal direction or the lateral direction of the reflector plate 51.

To avoid this, as shown in FIGS. 10(a) and 10(b), the parasitic element 52 that is made of conductor and is not in electrical contact with the cable antenna 1 is brought closer to the cable antenna 1.

In this way, the uniformity of the strength of the radiated electric field can be improved, and the one-side radiation can be enhanced. The radiated electric field, or specifically, whether to enhance the radiated electric field in the longitudinal direction of the reflector plate 51 or enhance the radiated electric field in the lateral direction of the reflector plate 51, can be adjusted by adjusting the dimension ratio (M1:M2) between the second members 52B shown in FIG. 10(a).

The gate antenna 50 formed by the array of openings formed by the stack of the cable antenna 1, the reflector plate 51, the parasitic element 52 and the like can generally identify a radio tag placed in parallel to the reflector plate 51, even if the radio tag is oriented in any direction. However, a radio tag placed perpendicularly to the reflector plate 51 may be difficult to identify.

To cope with this, as shown in FIG. 11, by taking advantage of the intrinsic flexibility of the cable antenna 1, the end part of the gate antenna 50 can be bent upward. This allows the cable antenna 1 to stably identify a radio tag three-dimensionally oriented in any direction. In FIG. 11, illustration of the parasitic element 52, the first spacer member 53 and the second spacer member 54 is omitted.

Specifically, a gate antenna 50B according to a variation is bent at parts where connections between the outermost rectangles in the longitudinal direction of the cable antenna 1 and the adjacent rectangles in the longitudinal direction are located so that opposite end parts of the gate antenna 50B in the longitudinal direction stand. Therefore, the gate antenna 50B has a U-shape in front view.

Figure 12A:
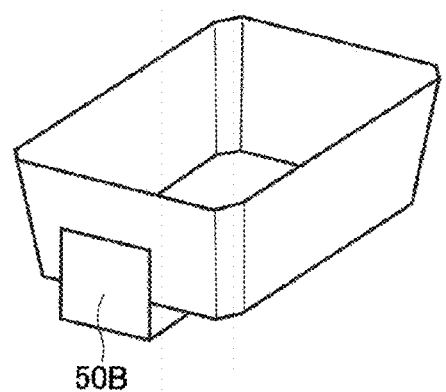
FIG. 12(*a*) is a diagram showing a use case of one gate antenna according to the present embodiment.

If a shopping basket or container containing a commodity with a radio tag is placed in the bottom part of the U-shape of the gate antenna 50B formed by bending the end parts of the plate-like electromagnetic wave radiating element as shown in FIG. 12(a), the radio tag can be identified and managed regardless of the orientation of the tag attached to the commodity. That is, at an unmanned cash register provided with the gate antenna 50B, commodities in the shopping basket 100 can be detected with high precision.

The gate antenna used for the unmanned cash register may be the gate antenna 50 having a planar shape, rather than the U-shape described above. In that case, again, similar effects can be attained.

Figure 12B:
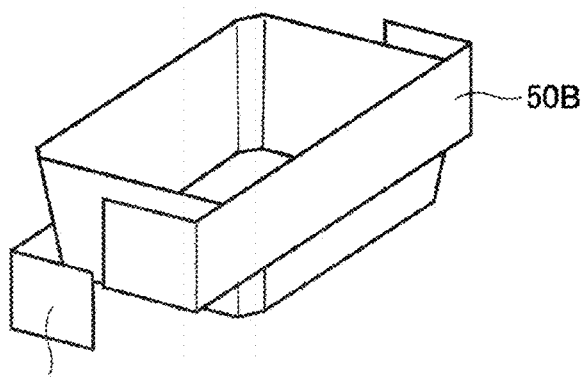

A plurality of such gate antennas 50B may be used to form an antenna unit. As shown in FIG. 12(b), an antenna unit according to the present embodiment has a plurality of gate antennas 50B, and the plurality of gate antennas 50B is arranged in different postures.

That is, the gate antennas 50B may be used in such orientations that the bottom parts of the U-shaped gate antennas 50B form a U-shape in plan view as shown in FIG. 12(b).

As shown in FIG. 12(b), two U-shaped gate antennas are arranged in opposite orientations with the bottom parts of the U-shaped gate antennas opposed to each other. The shopping basket 100 or container is put in the cavity inside the gate antennas 50B and irradiated with electromagnetic waves from four directions. Therefore, the reliability of the identification of commodities with a radio tag in the shopping basket 100 or container can be improved.

Figure 12C:
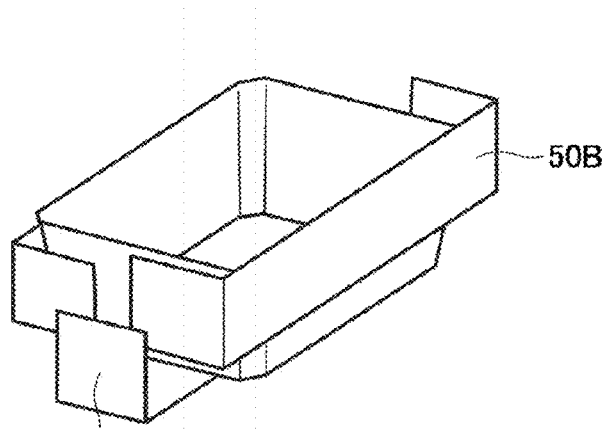

Alternatively, as shown in FIG. 12(c), three or more U-shaped gate antennas 50B may be used, and the shopping basket 100 or container put inside the cavity inside the gate antennas may be irradiated with electromagnetic waves from five directions, that is, below, front, back, left and right, thereby improving the reliability of the identification of commodities with a radio tag contained in the shopping basket 100 or container.

The gate antennas 50 and 50B according to the present embodiment has simpler configurations than conventional antennas and therefore can be manufactured at a significantly reduced cost.

When the cable antenna 1 is bent to form the array of square openings 30 as described above, the radiated electric field formed by a combination of white sinusoidal currents (indicated by white arrows in FIG. 8) and the radiated electric field formed by a combination of hatched sinusoidal currents (indicated by black arrows in FIG. 8) are perpendicular to each other. If the sections between the bends of the cable antenna 1 have a length of approximately λ/2, the radiated electric fields substantially synchronously vary in an oscillating manner.

Figure 13:
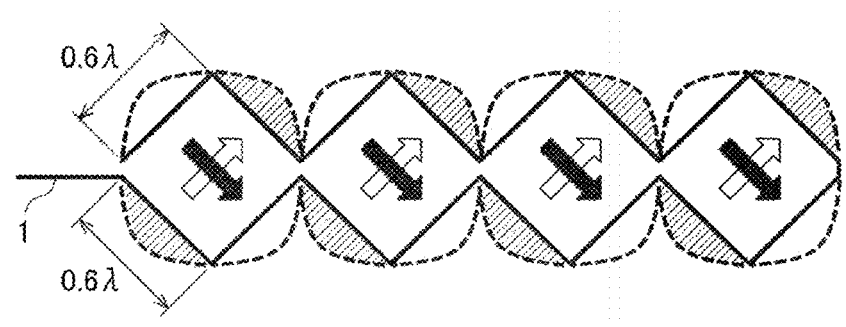
FIG. 13 is a diagram for illustrating a modified arrangement of the cable antenna according to the present embodiment.

On the other hand, as shown in FIG. 13, if the bending period of the cable antenna 1 is increased by about 0.1, that is, if the length of the side of the square is increased to 0.6, the oscillation of the electric field indicated by the black arrow lags behind the oscillation of the electric field indicated by the white arrow by about 0.2 periods.

This lag is equivalent to a difference in phase angle close to 90°, so that a composite electric field formed by the electric field indicated by the white arrow and the electric field indicated by the black arrow is an electric field temporally and spatially rotating.

Therefore, an antenna can be formed which is capable of radiating a circularly polarized wave similar to that of an identification antenna commonly used in the RFID system which is advantageous for identifying a radio tag oriented in an arbitrary direction. Although the array of openings 30 formed by the cable antenna 1 is desirably rotationally symmetrical in order to form a circularly polarized wave, the opening 30 may have a polygonal or circular shape, other than a square shape.

The embodiment described above is just an example of representative embodiments of the present invention. Therefore, various modifications can be made to the embodiment described above without departing from the spirit of the present invention.

For example, although the cable antenna 1 has a serpentine configuration as shown in FIG. 1 in the embodiment described above, the present invention is not limited to the configuration.

The cable antenna 1 may be arranged in a loop configuration, that is, a circular configuration, in plan view, for example. Alternatively, the cable antenna 1 may be arranged in a rectangular configuration in plan view with two parallel sides being at a particular distance.

If the cable antenna 1 is arranged in a spiral configuration, the cable antenna 1 can perform efficient radio communication with radio communication tags 2 three-dimensionally arranged.

Although in the embodiment described above, the cable antenna 1 has been described by taking as an example an RFID system using an electromagnetic wave in the UHF band, the present invention is not limited to such a configuration. The electromagnetic wave used for radio communication can have any other frequency.

Although in the embodiment described above, an arrangement has been described in which the insulating layer 12 as well as the outer conductor 13 is removed in the exposed part 15, the present invention is not limited to such an arrangement. In the exposed part 15, the insulating layer 12 may be left intact, and only the outer conductor 13 may be removed. The exposed part 15 may be provided at a bend 1A.

Although in the embodiment described above, an arrangement has been described in which the gate antenna includes the reflector plate 51, the first spacer member 53, the cable antenna 1, the second spacer member 54 and the parasitic element 52, the present invention is not limited to such an arrangement. That is, the gate antenna need not include the reflector plate 51, the first spacer member 53, the second spacer member 54 and the parasitic element 52.

Specifically, as an inexpensive gate antenna, the cable antenna 1 according to the present invention may be configured in such a manner that one of the diagonals of each rectangle is aligned with the corresponding one of the diagonals of the adjacent rectangles in plan view, and the cable antenna may be covered with a protective material. The cable antenna having such a configuration can also sufficiently serve as a gate antenna.

If such an inexpensive gate antenna is used in an unmanned cash register, the manufacturing cost of the unmanned cash register can be reduced.

Figure 14:
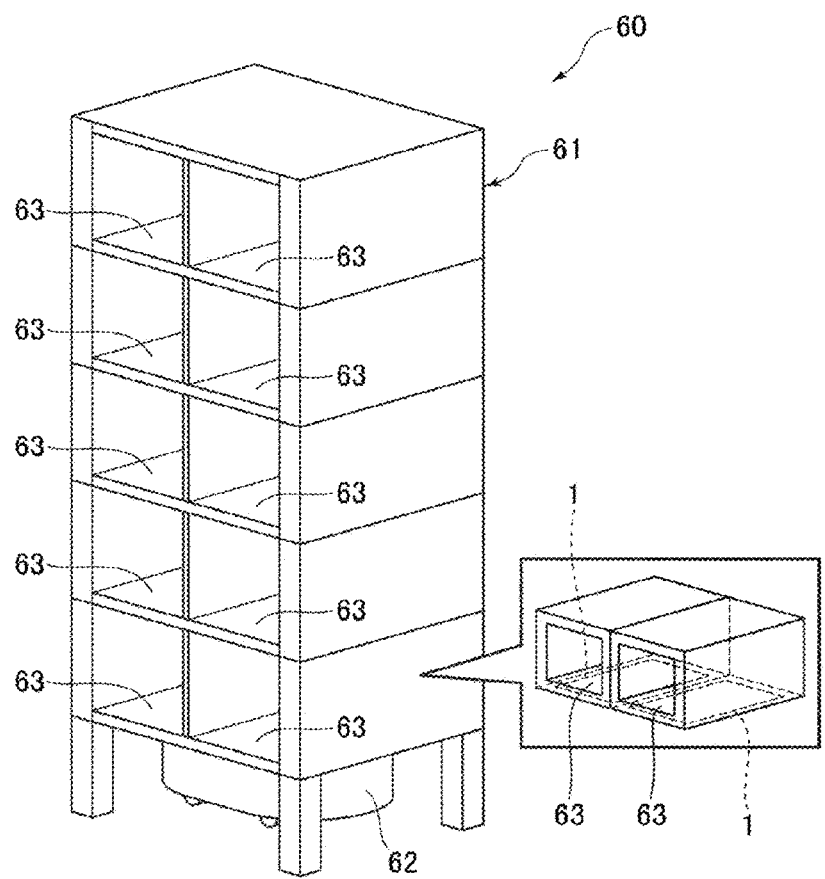
FIG. 14 is a perspective view of an automatic conveyor shelf according to the present embodiment.

Next, an example application of the cable antenna 1 will be described with reference to FIG. 14. FIG. 14 is a perspective view of an automatic conveyor shelf 60 according to the present embodiment. The automatic conveyor shelf 60 is a shelf that automatically moves in a warehouse.

As shown in FIG. 14, the automatic conveyor shelf 60 includes a shelf main unit 61, an automatic guided robot 62 (automatic guided vehicle: AGV) and the cable antenna 1. In the shelf main unit 61, a plurality of shelf compartments 63 is arranged in the vertical direction and the horizontal direction. Various commodities or supplies are housed in the compartments 63.

The automatic guided robot 62 has an internal power supply and an artificial intelligence (AI) installed therein, and is automatically controlled to travel in a warehouse in which the shelf main unit 61 is placed. In the example shown, the automatic guided robot 62 is disposed below the shelf. A movement of the automatic guided robot 62 will be described with reference to FIGS. 15 and 16.

Figure 15:
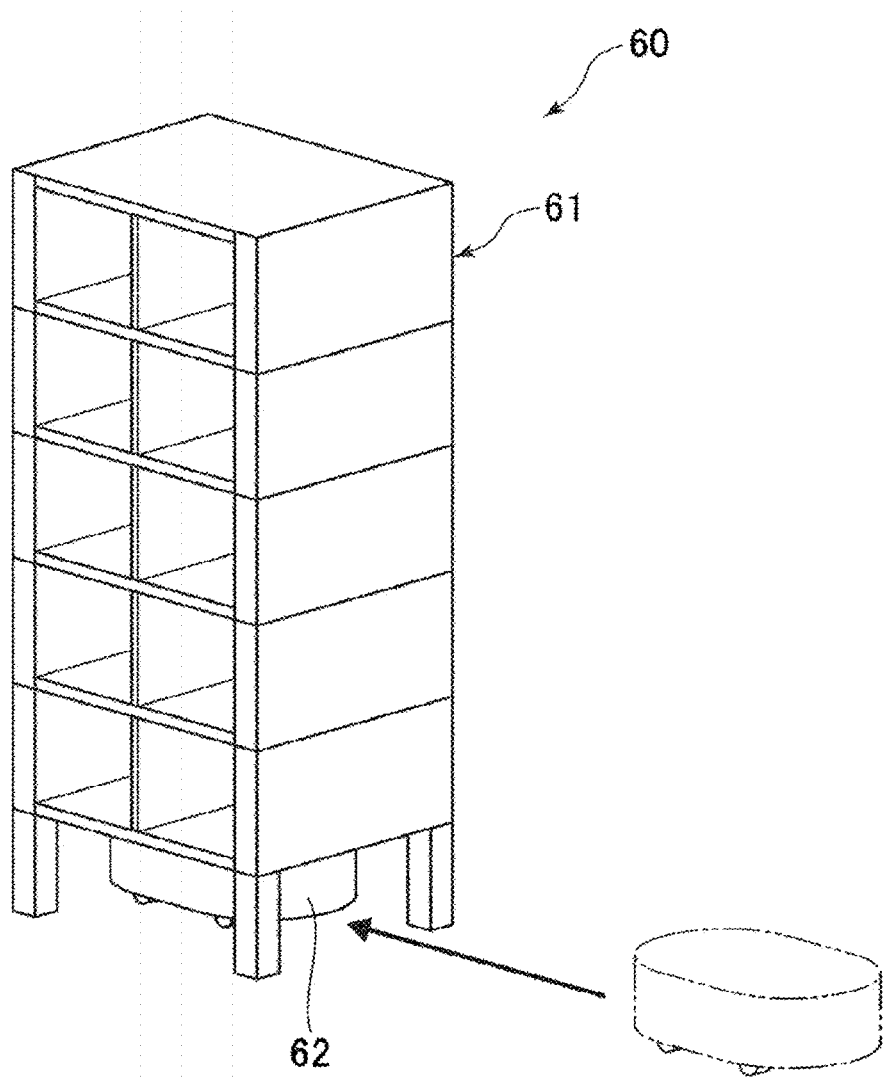
FIG. 15 is a first diagram for illustrating a movement of the automatic conveyor shelf according to the present embodiment in use.
Figure 16:
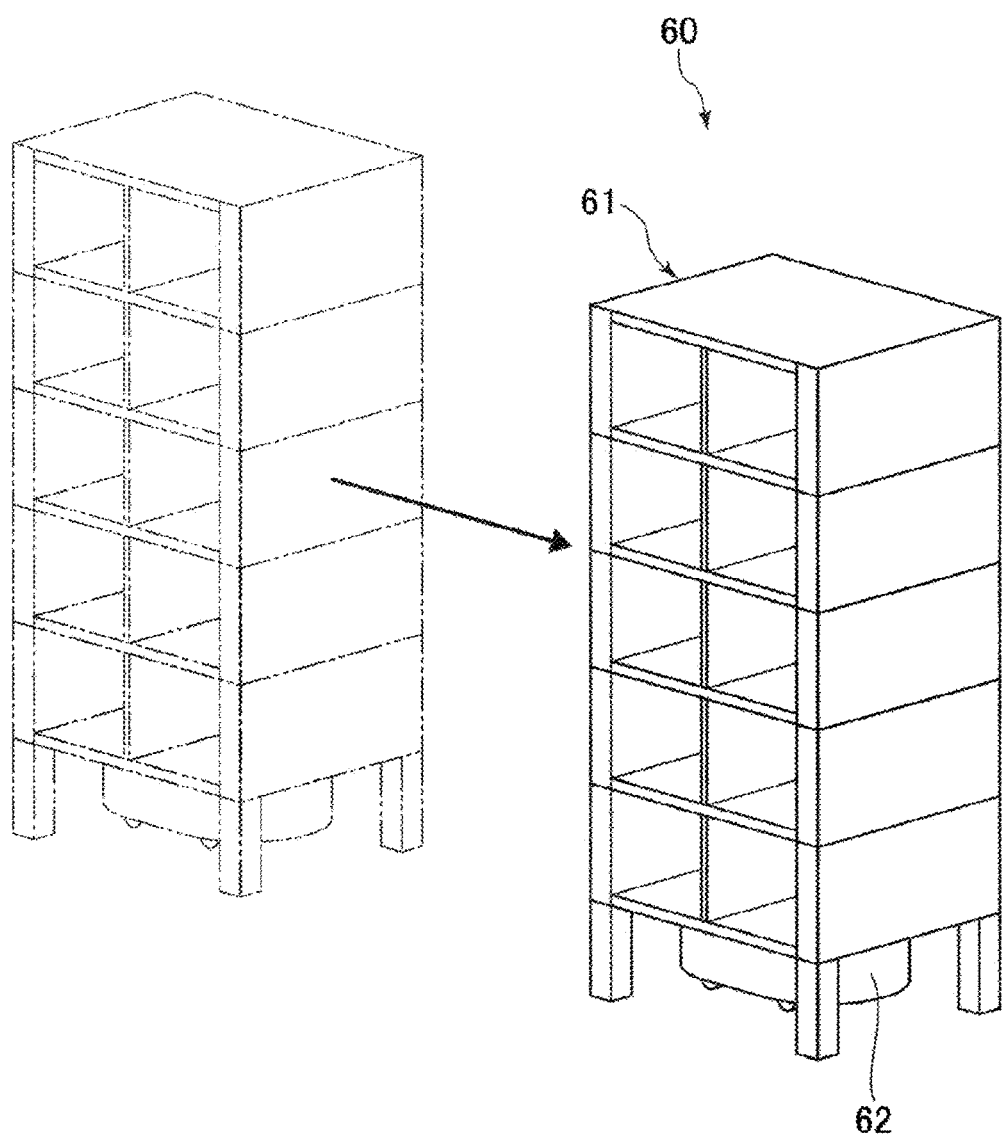
FIG. 16 is a second diagram for illustrating the movement of the automatic conveyor shelf according to the present embodiment in use.

FIG. 15 is a first diagram for illustrating a movement of the automatic conveyor shelf 60 in use. FIG. 16 is a second diagram for illustrating the movement of the automatic conveyor shelf 60 in use.

As shown in FIG. 15, the automatic guided robot 62 travels to below the shelf in which a commodity wanted by a user is stored. The automatic guided robot 62 then projects an upper part thereof upward to push the shelf main unit 61 upward from below. As a result, the legs of the shelf main unit 61 are slightly lifted off the floor of the warehouse.

In this state, as shown in FIG. 16, the automatic guided robot 62 moves with the shelf main unit 61 to a pick-up space where the user is located.

The user then takes the commodity wanted by the user from the compartment 63 of the shelf main unit 61.

The automatic guided robot 62 then guides the shelf main unit 61 to a prescribed storage location and ceases pushing the shelf main unit 61 upward. In this way, the shelf main unit 61 is placed at the prescribed storage location. The automatic guided robot 62 then returns to a prescribed charging station and is charged.

As shown in FIG. 14, the cable antenna 1 is provided on the bottom of each of the plurality of compartments 63 provided in the automatic conveyor shelf 60.

The cable antenna 1 is arranged on the bottom of each of the plurality of compartments 63, and an RFID tag is attached to the commodities stored in the compartments 63. Therefore, whether a commodity is stored in each compartment 63 can be automatically instantly grasped.

The cable antenna 1 may have the structure of the inexpensive gate antenna described above. End parts of the plurality of cable antennas 1 provided on the bottoms of the plurality of compartments 63 are arranged on the bottom of the shelf main unit 61.

When the automatic guided robot 62 pushes the shelf main unit 61 from below, a connector provided on an upper surface of the automatic guided robot 62 and a connector connected to the end parts of the plurality of cable antennas 1 are coupled to each other, and the internal power supply incorporated in the automatic guided robot 62 supplies a current to the cable antennas.

The automatic guided robot 62 has an RFID reader. Therefore, the RFID reader can read information from the RFID tags detected by the antennas supplied with the current, and transmit the information to the outside through radio communication. The RFID reader may be incorporated in or externally added to the automatic guided robot 62.

In this way, the automatic conveyor shelf 60 provided with the cable antennas 1 can automatically detect what kinds of commodities are stored in the compartments 63, and therefore automatic stocktaking or automatic receipt/shipment management can be performed.

The present invention is not limited to the variations described above, and some of these variations may be selected and appropriately combined or may be further modified.

APPENDIX

An automatic conveyor shelf system, comprising:
an automatic conveyor shelf;
an automatic guided robot; and
the cable antenna according to claim 3 or the gate antenna according to claim 7 or 11,
wherein a reader/writer provided in the unmanned automatic guided robot is connected by wire to any of the antennas described above and automatically reads RFID commodity information from a commodity or article placed on the shelf, and the read commodity/article information is transferred to an upper system by a radio system to perform automatic management of information about receipt/shipment or inventory.

The invention claimed is:

1. A cable antenna an end part of which is connected to an oscillator that supplies a high-frequency current,
the cable antenna is bent at a plurality of bends in such a manner that sections on both sides of a bend are not parallel to each other, so that the cable antenna forms one or more openings having the shape of a rectangle all of four sides of which have a length equal to a half of the wavelength,
comprising:
an inner conductor extending in a cable-like configuration;
an insulating layer covering the inner conductor; and
an outer conductor covering the insulating layer,
wherein only one exposed part is formed in a middle part of the cable antenna in a longitudinal direction, the exposed part being formed by removing at least the outer conductor,
a distance L between a tip end of the cable antenna and an end of the exposed part on a side closer to the tip end is an odd multiple of a quarter of a wavelength $\lambda$ of the high-frequency current, and
a length G of the exposed part in the longitudinal direction satisfies the following formula (1)

$$\lambda/20 \leq G < \lambda/4 \tag{1}$$

where $\lambda$ denotes the wavelength (mm) of the high-frequency current.

2. The cable antenna according to claim 1, wherein the rectangle is a square.

3. The cable antenna according to claim 1, wherein
the cable antenna forms two or more of the openings, and
one of diagonals of each of the rectangles and a corresponding one of diagonals of an adjacent rectangle are aligned with each other in plan view.

4. The cable antenna according to claim 1, wherein the cable antenna is formed from a coaxial cable having an inner conductor, an insulating layer, an outer conductor and an outer jacket by removing a same length of the outer jacket, the outer conductor and the insulating layer.

5. A gate antenna, comprising:
a conductive reflector plate;
a first spacer member that is not conductive and is stacked on the reflector plate on one side in a perpendicular direction, the perpendicular direction being perpendicular to front and back surfaces of the reflector plate;
the antenna according to claim 1, the cable antenna being stacked on the first spacer member on one side in the perpendicular direction;
a second spacer member that is not conductive and is stacked on the cable antenna on one side in the perpendicular direction; and
a parasitic element that is conductive and is stacked on the second spacer member on one side in the perpendicular direction.

6. The gate antenna according to claim 5, wherein the reflector plate has a rectangular shape extending in a lateral direction and a longitudinal direction, and
the parasitic element comprises:
a plurality of first members that extends in the lateral direction and spaced apart from each other in the longitudinal direction; and
a plurality of second members that extends in the longitudinal direction and connects end parts of the plurality of first members to each other alternately on either side along the longitudinal direction.

7. The gate antenna according to claim 5, wherein the cable antenna forms three or more of the openings, and
the gate antenna is bent at parts where connections between outermost rectangles in the longitudinal direction of the cable antenna and adjacent rectangles in the longitudinal direction are located so that opposite end parts of the gate antenna in the longitudinal direction stand.

8. An antenna unit, comprising a plurality of the gate antennas according to claim 7,
wherein the plurality of gate antennas is arranged in different postures.

9. A gate antenna, comprising the cable antenna according to claim 2.

10. An automatic conveyor shelf, comprising:
the gate antenna according to claim 9; and
an automatic guided robot.

11. An unmanned cash register, comprising the gate antenna according to claim 5.

12. An unmanned cash register, comprising the gate antenna according to claim 9.

* * * * *